United States Patent
Chou et al.

(10) Patent No.: US 7,899,315 B2
(45) Date of Patent: Mar. 1, 2011

(54) METHOD OF AUTOMATICALLY ADJUSTING THE DEPTH OF FIELD

(75) Inventors: Hong-Long Chou, Taipei (TW); Shih-Yuan Peng, Banciao (TW)

(73) Assignee: Altek Corporation, Hsinchu (TW)

( * ) Notice: Subject to any disclaimer, the term of this patent is extended or adjusted under 35 U.S.C. 154(b) by 154 days.

(21) Appl. No.: 12/337,800

(22) Filed: Dec. 18, 2008

(65) Prior Publication Data
US 2009/0162044 A1      Jun. 25, 2009

(30) Foreign Application Priority Data
Dec. 19, 2007    (TW) .............................. 96148771 A

(51) Int. Cl.
*G03B 17/00*    (2006.01)
*G03B 3/10*    (2006.01)

(52) U.S. Cl. ........................................ 396/77; 396/121

(58) Field of Classification Search ............... 396/63, 396/77, 80, 81, 121–124, 137, 233, 234; 348/345, 348, 362, 363
See application file for complete search history.

(56) References Cited

U.S. PATENT DOCUMENTS 6,088,539 A * 7/2000 Aoyama ..................... 396/123
7,433,508 B2 * 10/2008 Sakai et al. .................. 382/144
2008/0079837 A1 * 4/2008 Masubuchi ................. 348/345

* cited by examiner

*Primary Examiner*—W. B. Perkey
*Assistant Examiner*—Minh Q Phan
(74) *Attorney, Agent, or Firm*—Workman Nydegger

(57) ABSTRACT

A method of automatically adjusting a depth of field, suitable for adjusting settings relevant to the depth of field when pre-shooting an image to be shot through a digital camera, includes capturing an image to be shot; dividing the image into a plurality of detected blocks; performing a statistic process for an object distance on each detected block, and recording an object distance value of each detected block; generating an object-distance cumulative curve according to the object distance value of each detected block; performing a smoothing process to eliminate peak curves generated in the object-distance cumulative curve; looking up a mode of all the object distance values and a corresponding detected block according to the object-distance cumulative curve; adjusting corresponding aperture and focal length of the digital camera according to the corresponding detected block. The user shoots images at different sites without adjusting the digital camera into corresponding shoot mode.

7 Claims, 12 Drawing Sheets

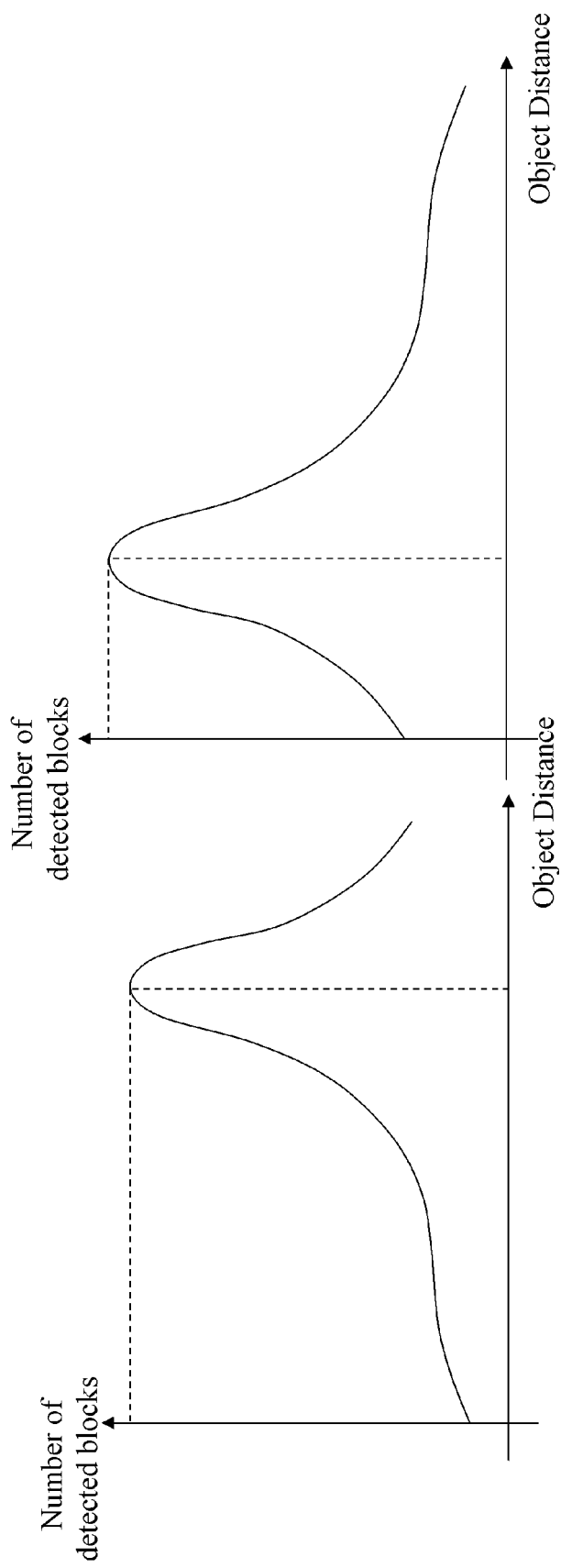

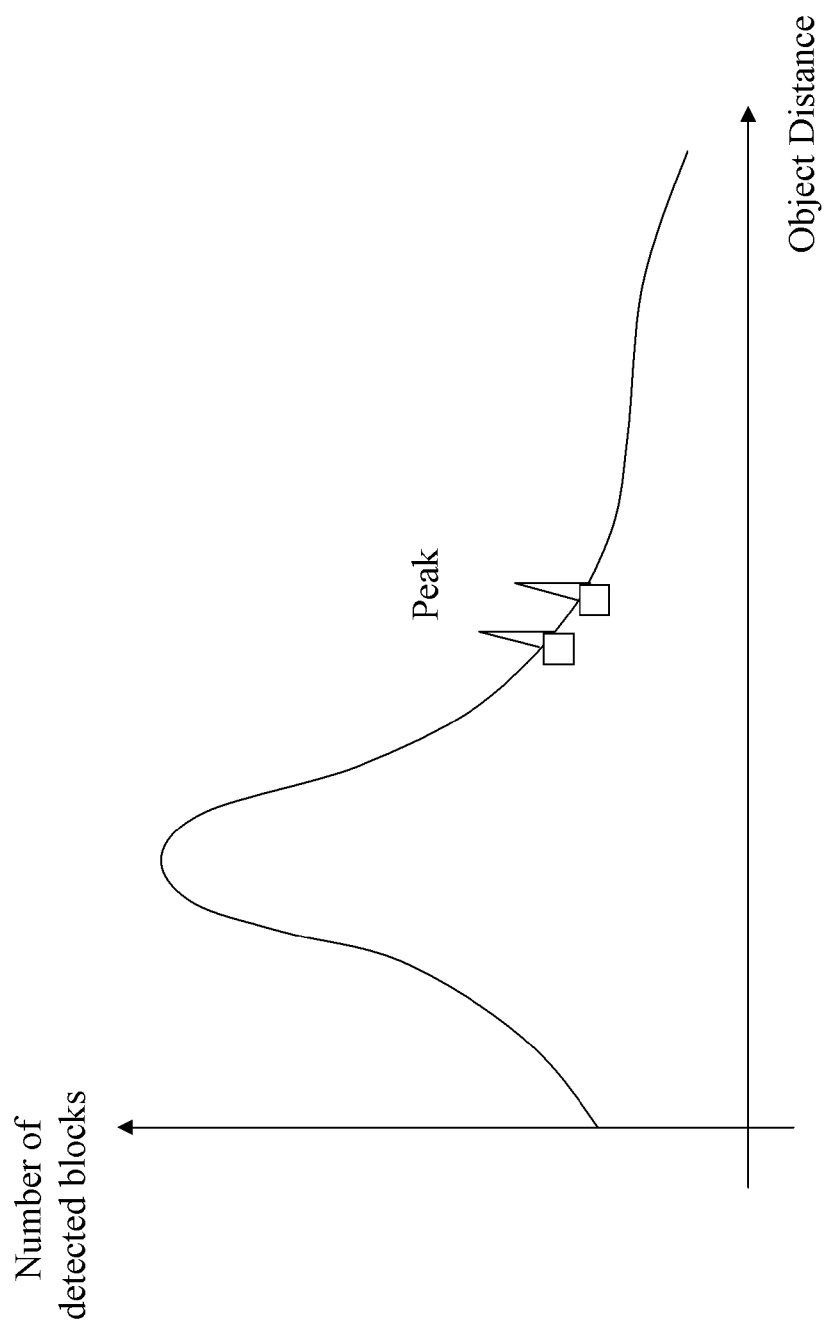

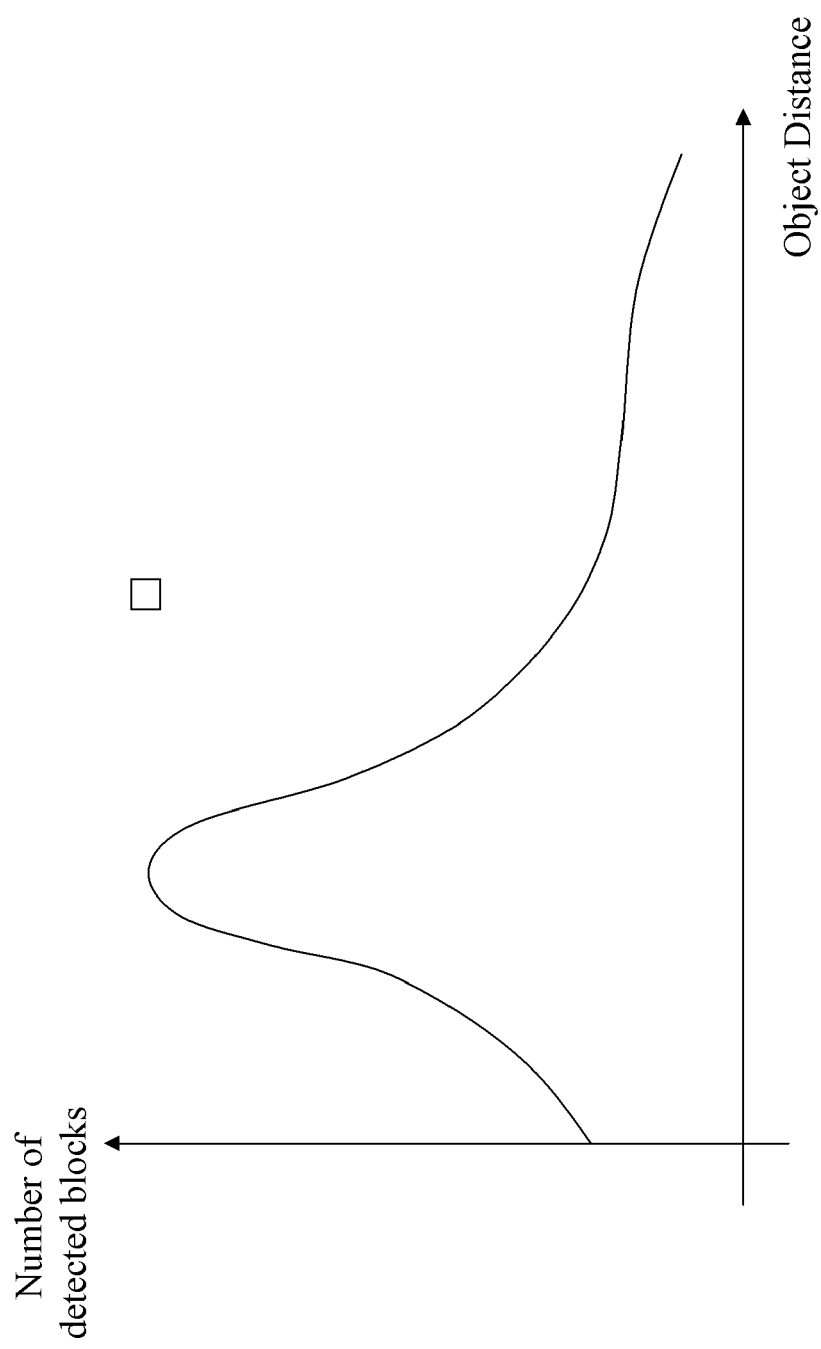

METHOD OF AUTOMATICALLY ADJUSTING THE DEPTH OF FIELD

CROSS-REFERENCE TO RELATED APPLICATIONS

This non-provisional application claims priority under 35 U.S.C. §119(a) on Patent Application No(s). 096148771 filed in Taiwan, R.O.C. on Dec. 19, 2007 the entire contents of which are hereby incorporated by reference.

BACKGROUND OF THE INVENTION

1. Field of the Invention

The present invention relates to a method of adjusting parameters for shooting a digital image. More particularly, the present invention relates to a method for adjusting the depth of field when a digital camera is used to shoot images at different object distances according to the object distances in different regions of the image to be shot.

2. Related Art

As the rapid development of digital cameras, the photography is no longer an expensive consumption. The user can take pictures whenever he/she wants to record the memorable moment or scenery. In order to highlight the image to be shot, a technique of shallow depth of field (DOF) is generally adopted to make the object become clear and the overall background become fuzzy, and thus extracting the object to be shot from the background, thereby making the object to be shot become more attractive. The depth of field refers to a distance before or after the object having the clearest image while the imaging definition are still qualified, which is relevant to the focal length, aperture of the lens, object distance, and circle of confusion. Substantially, the larger the aperture is and the higher the focus range is, the shallower the depth of field is.

The effect of the shallow DOF is determined by the relationship among the aperture, focal length, and object distance. The object distance refers to the distance between the lens of the digital camera and the object to be shot. The focal length refers to the distance between the lens and the photosensitive element. Referring to FIG. 1a, it is a schematic view of the relationship between a focal length and an object distance. Generally, the larger the aperture is, the shallower the depth of field is; the longer the focal length is (approaching the telephoto end), the shallower the depth of field is; the closer the object distance (the distance between the lens and the object), the shallower the depth of field is. Referring to FIG. 1b, it is a schematic view of a shallow depth of field (DOF) imaging process.

On the contrary, when taking scenery pictures, a deep depth of field is required when shooting the whole scenery image. At this time, the digital camera needs to be adjusted to a small aperture, short focal length, or long object distance, so as to lengthen the depth of field. Referring to FIG. 1c, it is a schematic view of a deep depth of field (DOF) imaging process.

However, as for a common user, since he/she may not have sufficient knowledge about photograph, he/she cannot further adjust the corresponding parameters of the camera, and as a result, he/she cannot take a satisfactory picture. If selecting the photograph mode of adjusting the digital camera, sometimes, the user may forget to adjust the camera into the corresponding photograph mode. For example, if the macro mode is used to take a scenery picture, the scenery picture is rather fuzzy, and vice versa.

SUMMARY OF THE INVENTION

Accordingly, the present invention is directed to a method of automatically adjusting a depth of field, which is suitable for adjusting parameters relevant to the depth of field when pre-shooting an image to be shot through using a digital camera.

In order to achieve the above objective, the present invention provides a method of automatically adjusting a depth of field, which includes the following steps: pre-shooting an image to be shot; dividing the image to be shot into a plurality of detected blocks; adjusting a size of each of the detected blocks, according to the scene or object that has been shot; performing a statistic means for an object distance on each detected block, and recording an object distance value of each detected block respectively; making a statistics on the number of detected blocks having the same object distance value, for generating a corresponding object-distance cumulative curve; performing a smoothing process on the object-distance cumulative curve; looking up a mode value of the object-distance cumulative curve and a corresponding detected block; and adjusting the parameters of the depth of field according to the corresponding detected block, so as to shoot the image.

The present invention provides a method of automatically adjusting a depth of field, which is suitable for adjusting a depth of field of an image to be shot according to the object distance of each of the detected blocks of the image to be shot. Therefore, before the user shoots an image, the digital camera can automatically adjust a shooting condition of the depth of field for the object to be shot according to such an adjusting method.

BRIEF DESCRIPTION OF THE DRAWINGS

The present invention will become more fully understood from the detailed description given herein below for illustration only, which thus is not limitative of the present invention, and wherein:

FIG. 4a is a schematic view of an object-distance cumulative curve;

FIG. 4b is a schematic view of an object-distance cumulative curve;

FIG. 5a is a schematic view of an object-distance cumulative curve having a plurality of peaks;

FIG. 7 is schematic view of an object-distance interval cumulative curve according to another embodiment of the present invention.

DETAILED DESCRIPTION OF THE INVENTION

Figure 1A:
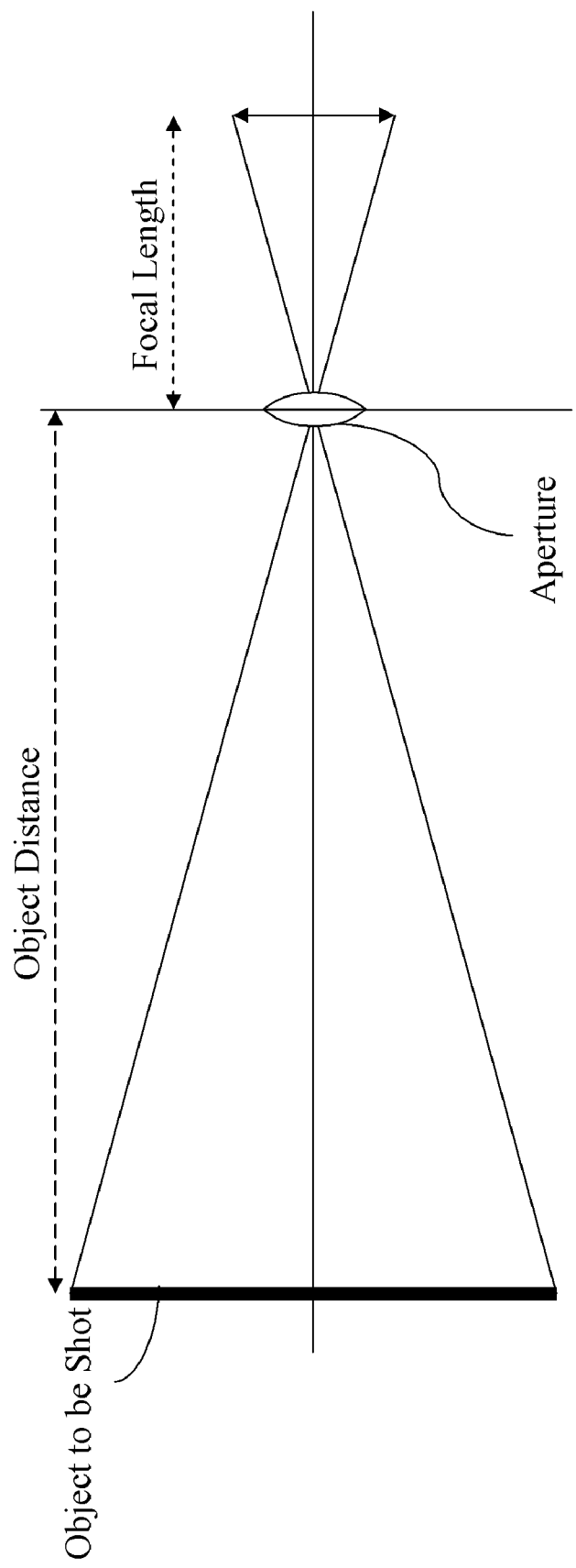
FIG. 1a is a schematic view of the relationship between a focal length and an object distance.
Figure 1B:
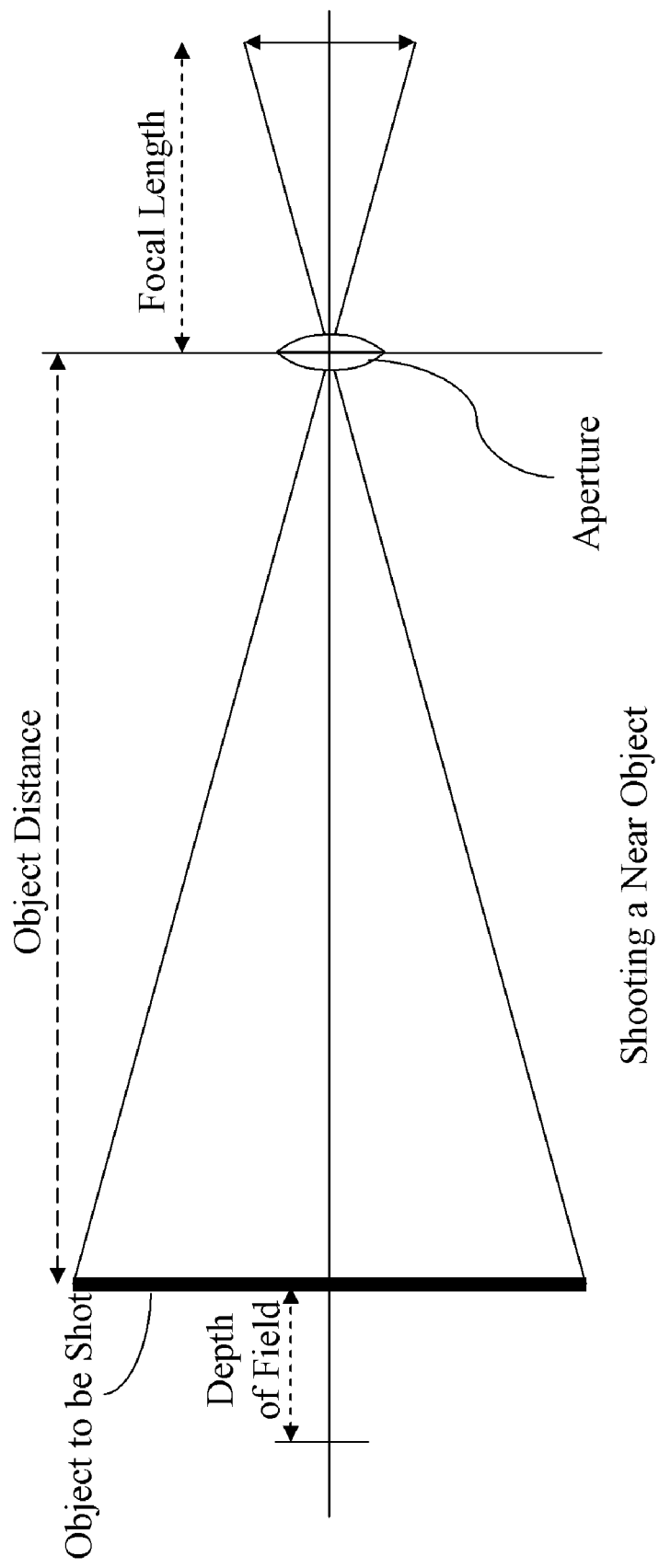
FIG. 1b is a schematic view of a shallow depth of field (DOF) imaging process.
Figure 1C:
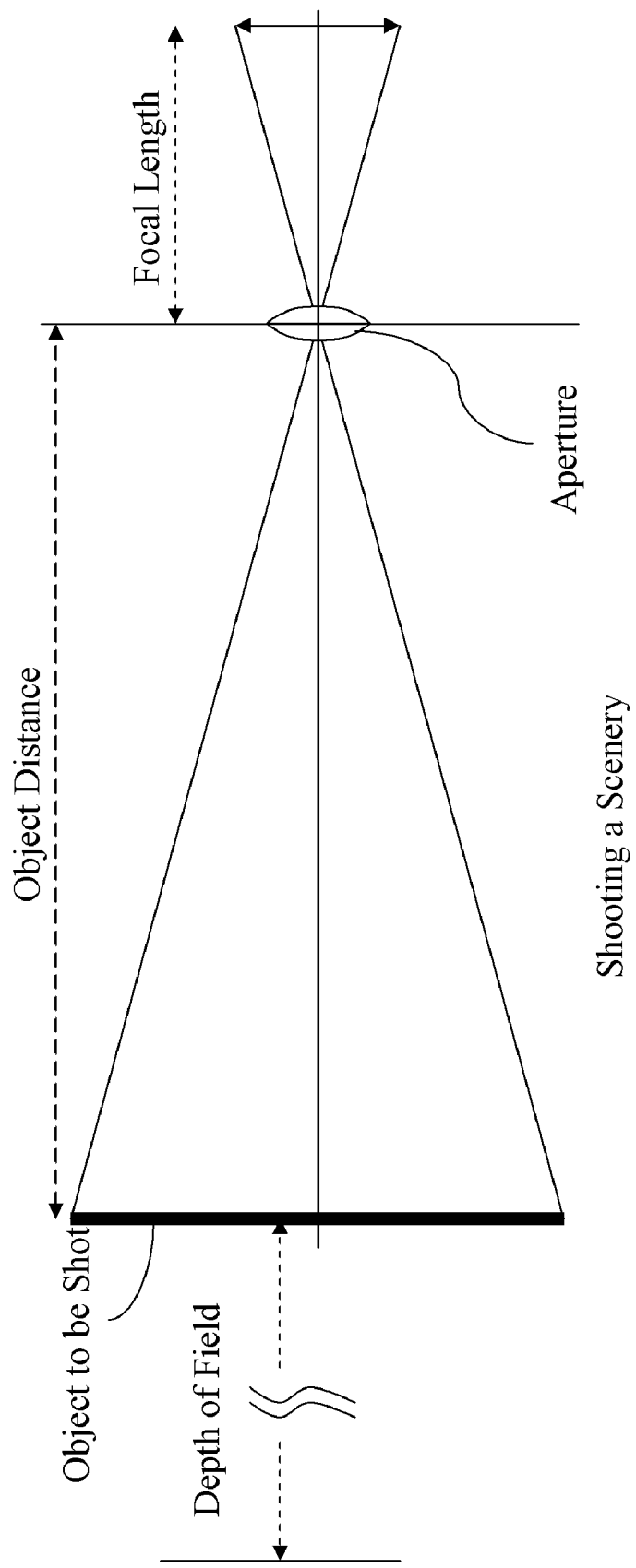
FIG. 1c is a schematic view of a deep depth of field imaging process.
Figure 2:
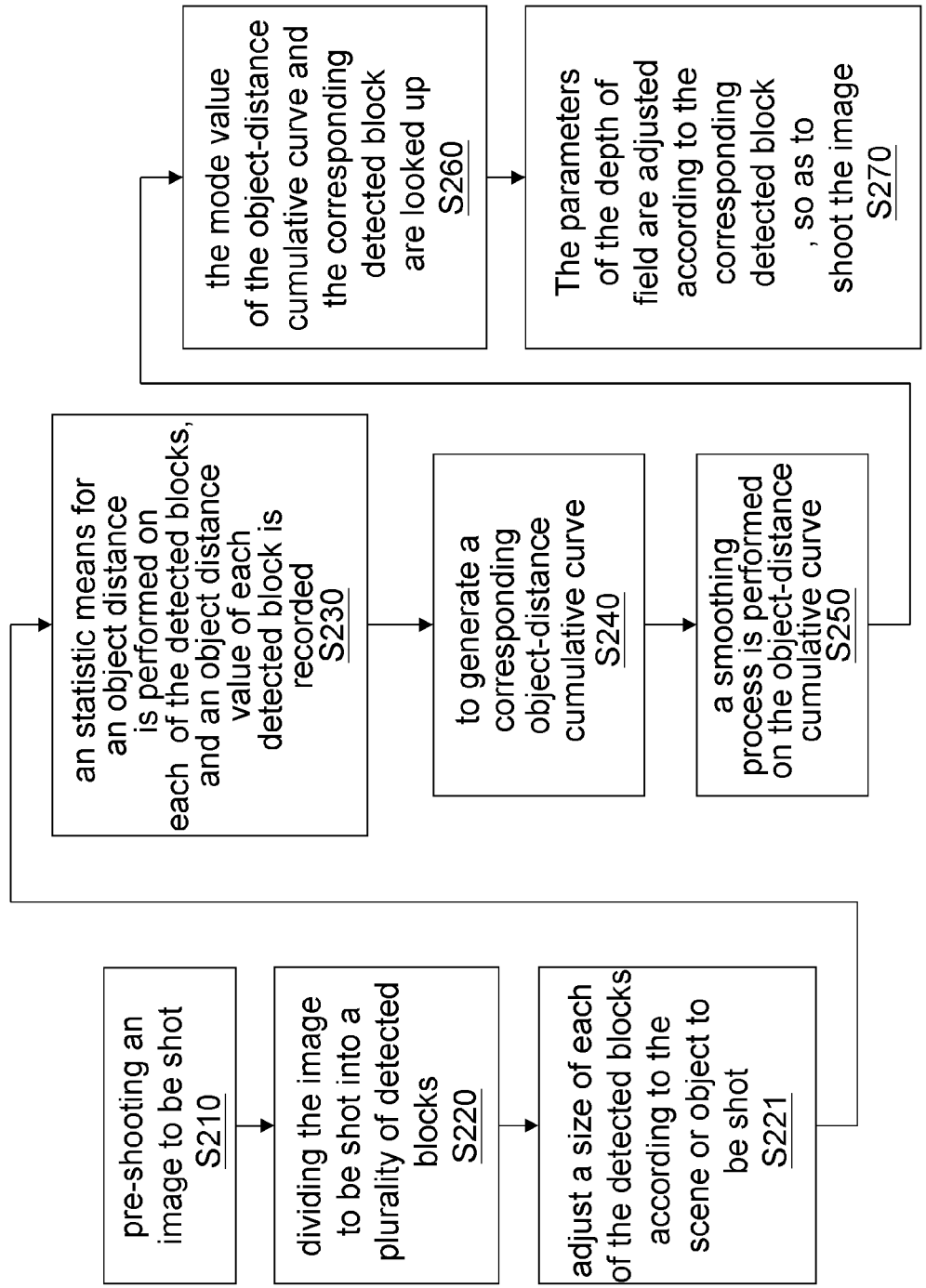
FIG. 2 is a schematic flow chart of an operation of the present invention.

Referring to FIG. 2, it is a schematic flow chart of an operation of the present invention. The adjusting method of the present invention includes the following steps: pre-shooting an image to be shot (Step S210); then dividing the image 300 to be shot into a plurality of detected blocks (Step S220), and in Step S220 when dividing the image 300 into detected blocks, the digital camera may adjust a size of each of the detected blocks according to the scene or object to be shot (Step S221).

Figure 3A:
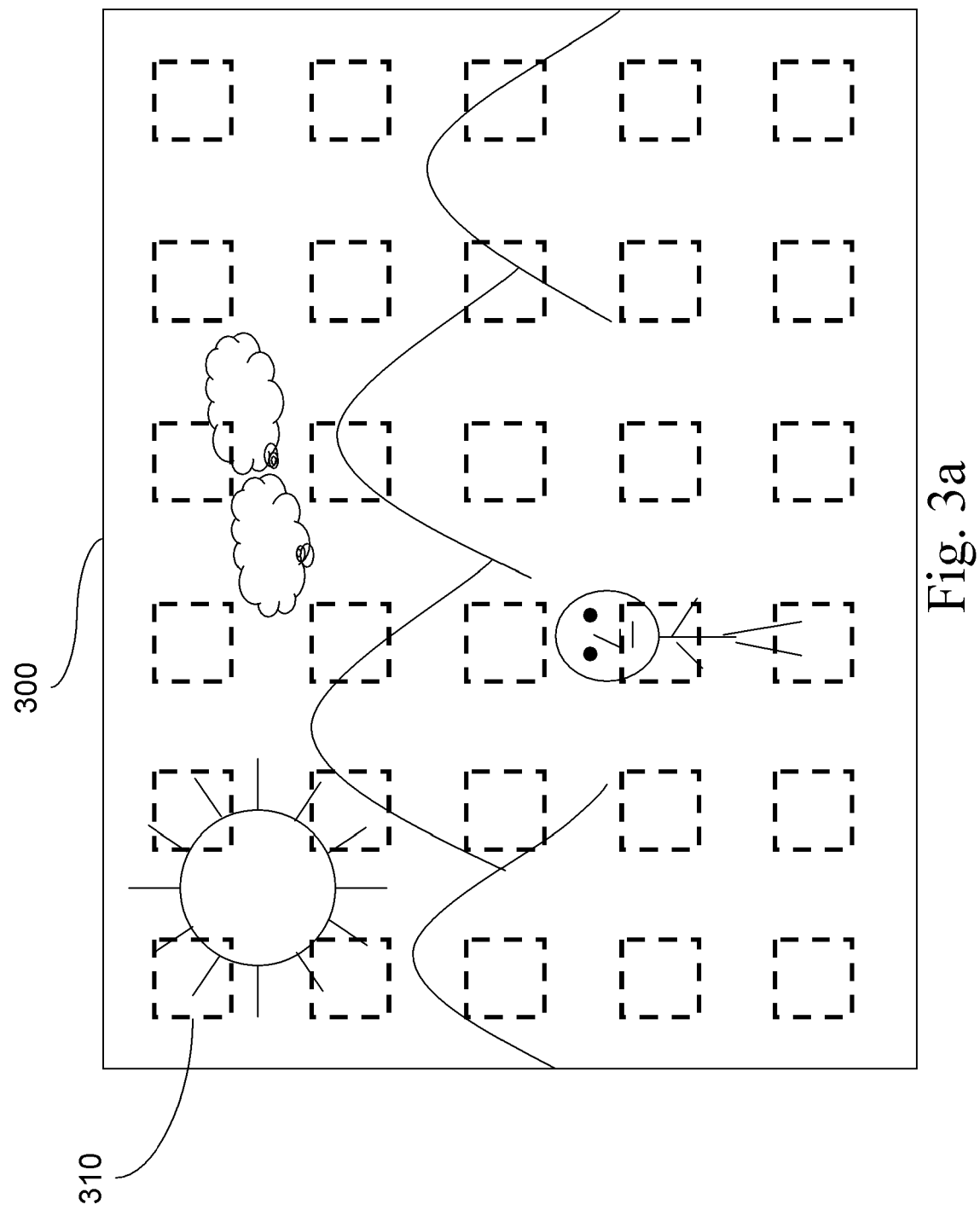
FIG. 3a is a schematic view of detected blocks in a digital image.
Figure 3B:
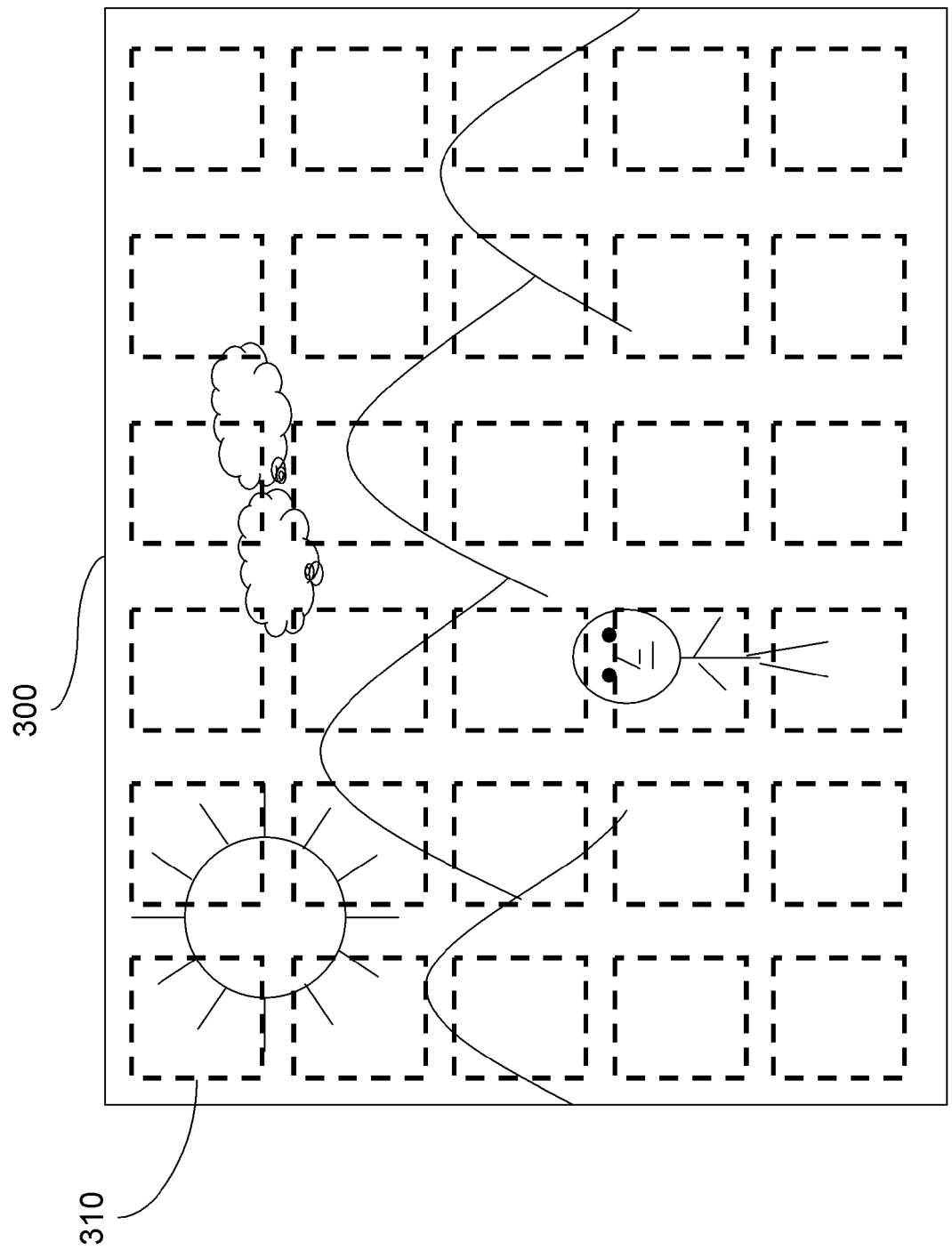
FIG. 3b is a schematic view of detected blocks in different ranges.

The number of the detected blocks 310 is determined by an operation speed of the digital camera or a size of the image 300 to be shot. The higher the processing speed of the digital camera is, the more detected blocks 310 may be set; and the larger the image 300 to be shot is, the more detected blocks 310 may be set. The number of the detected blocks 310 in the image 300 to be shot is fixed, and each of the detected blocks 310 has the same size. Then, referring to FIG. 3a, it is a schematic view of detected blocks in an image to be shot. The black dash-line frames in FIG. 3a indicate the detected blocks 310. It should be particularly noted that, the range of each of the detected blocks 310 is not overlapped with another detected block 310, and thus, a fixed gap is required between each two detected blocks 310. In this way, it is ensured that the numerals in each of the detected blocks 310 will not be calculated repeatedly. Then, referring to FIG. 3b, it is a schematic view of detected blocks in different ranges.

Then, a statistic means for an object distance is performed on each of the detected blocks, and an object distance value of each of the detected blocks is recorded (Step S230). A focusing process is respectively performed on each of the detected blocks 310 in FIG. 3a. The object distance of the object to be shot in each of the detected blocks 310 is reversely deducted through a focusing algorithm. The object distance refers to the distance between the digital camera and the object to be shot. When the digital camera is used for shooting images, different object distances may affect the aperture and focal length during the shooting motion. As an image 300 to be shot may simultaneously include different regions far or near, different object distances are generated for the object to be shot in different detected blocks 310.

The focusing process may be performed according to different algorithms or circuits, and the manner of the focusing process is demonstrated below through the following example, in which a photosensitive element disposed outside the digital camera is used for focusing assistance. Firstly, the photosensitive element disposed outside the camera detects the environment light. The digital camera calculates the charges on the photosensitive element and measures the distance in the mode of triangulation measurement. Next, the digital camera adjusts the lens to move the lens forwards or backwards. The step of adjusting the lens is repeated, till the number of the charges reaches the maximum level. At this time, the lens set is fixed at the position where the maximum changes are obtained. Then, the shutter is opened, and the digital camera fine tunes the focal length according to the numbers obtained through sampling the main photosensitive element for recording images.

According to the detected blocks obtained in Step S230, it performs statistics on the number of detected blocks having the same object distance, so as to generate a corresponding object-distance cumulative curve (Step S240), in which the detected blocks 310 having the same object distance are added one by one and the number thereof is calculated through performing statistics.

It performs statistics on the number of detected blocks 310 corresponding to different object distances respectively, and according to the statistic results, an object-distance cumulative curve is generated. Referring to FIGS. 4a and 4b, they are respectively schematic views of different object-distance cumulative curves. The transverse axis in FIG. 4a indicates the object distance, and the longitudinal axis indicates the number of detected blocks 310 having the same object distance. In FIG. 4a, it can be seen that, most of the objects to be shot in FIG. 4a have a larger object distance value, and thus FIG. 4a may show that an image 300 at a long distance away is shot. Similarly, most of the objects to be shot in FIG. 4b have a small distance, and thus FIG. 4b may show that an image 300 at a nearer distance is shot. As the object-distance cumulative curve is generated through performing statistics on the detected blocks 310, a curve with a plurality of peaks as shown in FIG. 5a may occur.

Figure 5B:
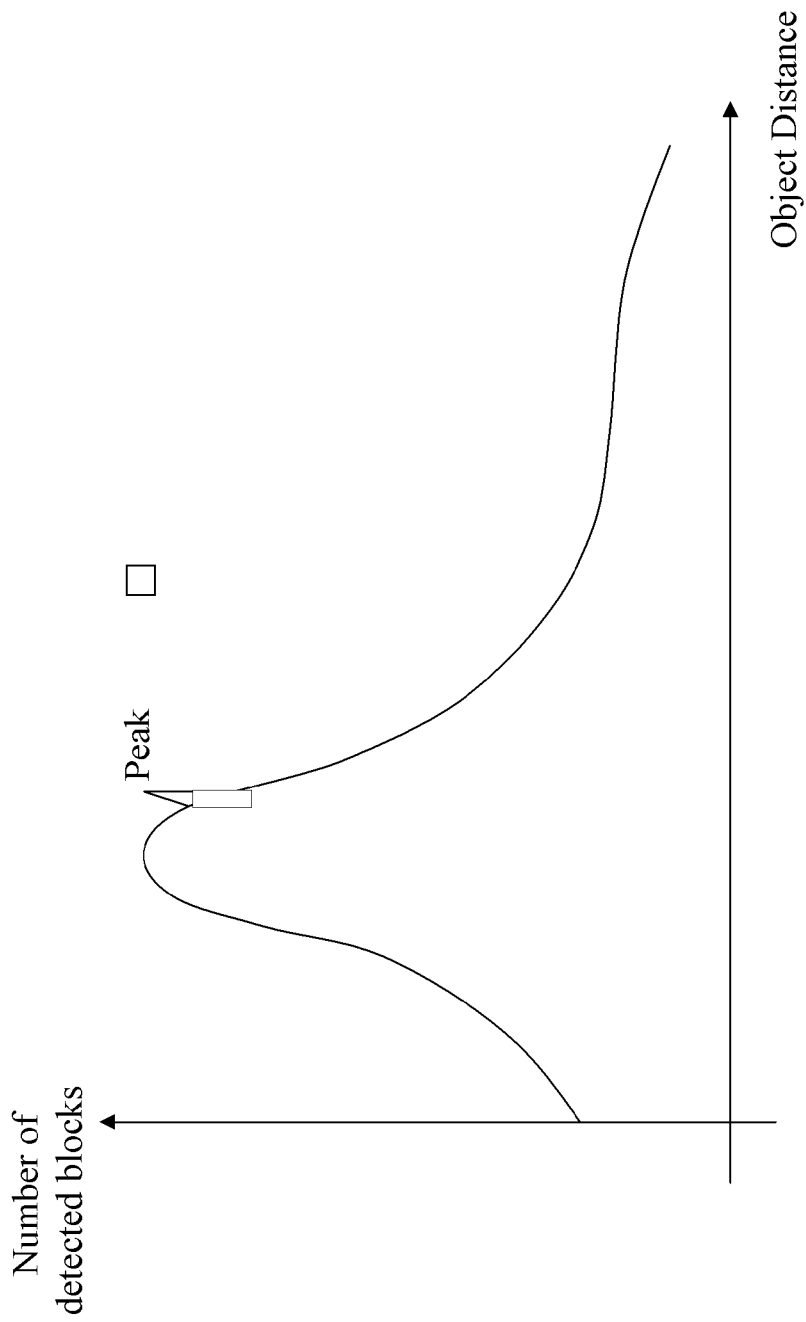
FIG. 5b is a schematic view of an object-distance cumulative curve having peaks.

Then, a smoothing process is performed on the object-distance cumulative curve (Step S250), so as to reduce the peaks in the object-distance cumulative curve. A plurality of peaks may also exist in the object-distance cumulative curve obtained in Step S240. Referring to FIG. 5b, it is a schematic view of an object-distance cumulative curve having peaks. The existence of the peaks may affect the process of looking up the mode of the object-distance cumulative curve. Taking FIG. 5b as an example, the peaks in FIG. 5b may cause a plurality of modes in the curve, such that the digital camera cannot make a correct interpretation.

Figure 5C:
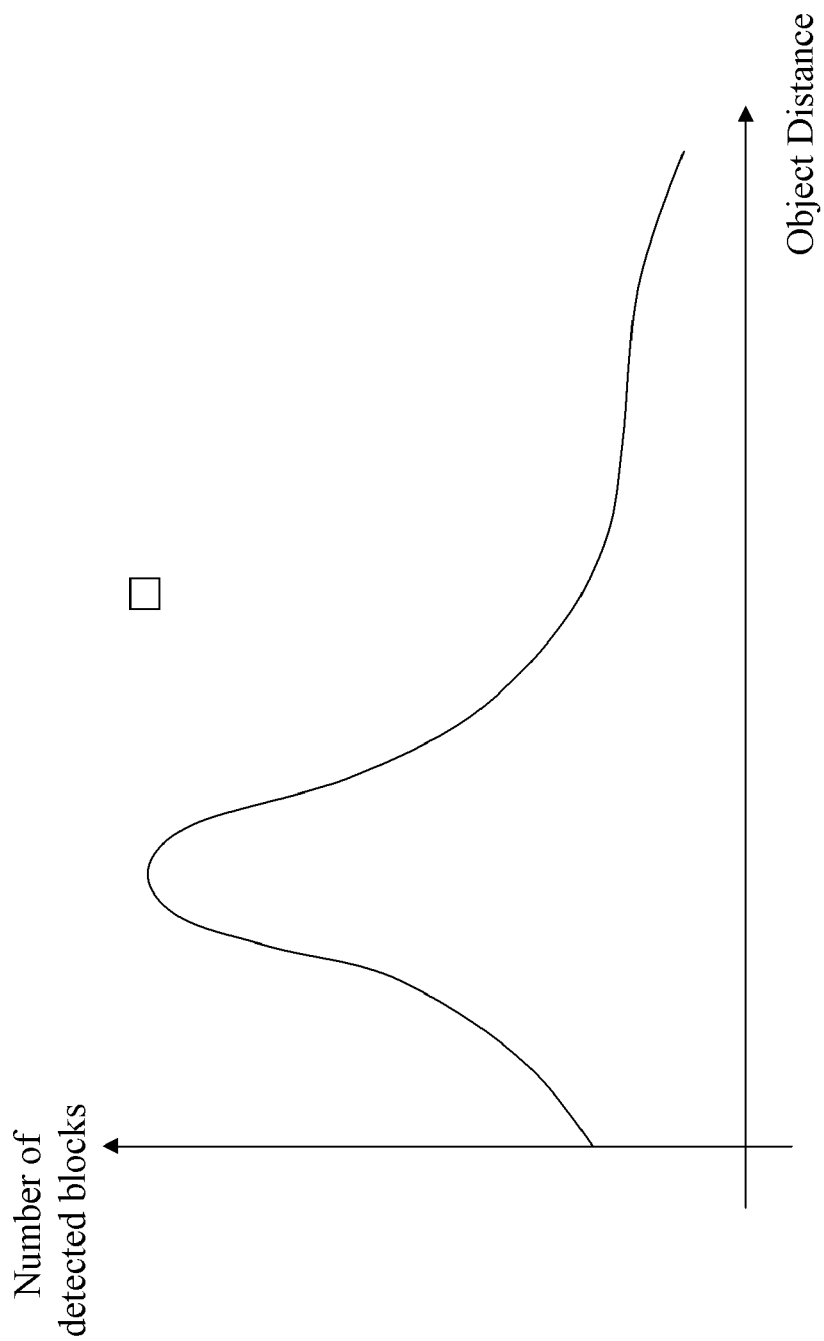
FIG. 5c shows an object-distance cumulative curve after the smoothing process.

Therefore, a smoothing process is performed on the object-distance cumulative curve obtained in Step S240, so as to eliminate the peaks as much as possible. The present invention can utilize the changes in slope difference, interpolation calculation (such as extrapolation or interpolation) or Bezier curve to minimize the changes in the number caused by the peaks of the object-distance cumulative curve. Referring to FIG. 5c, it shows an object-distance cumulative curve after the smoothing process.

Then, the mode value of the object-distance cumulative curve and the corresponding detected block are looked up (Step S260), and the corresponding mode is looked up according to the object distance values. The mode refers the data mostly frequently occurs among all statistic data. For example, in the series of {5,9,7,3,5,4,5,6,10,2,8,1,3,5}, as "5" appears most frequently, "5" is taken as the mode of the series. Similarly, according to the object-distance cumulative curve, the detected blocks 310 having the largest number of the same object distance is looked up. If there are two modes/peaks at the same time, the digital camera may select one mode that is most close to the shooting range set by the user as the standard depth of field that is mainly set according to the set shooting range.

If there are increasingly more detected blocks 310 having the same object distance in the image 300 to be shot, it indicates that the object to be shot occupies a large region in the image 300 to be shot. In other words, when shooting a human image, many detected blocks 310 having a small object distance exist in the image 300 to be shot. On the contrary, when shooting a scenery image, the more the detected blocks 310 are, the more the objects at a large object distance exist in the image 300 to be shot.

The parameters of the depth of field are adjusted according to the corresponding detected block, so as to shoot the image (Step S270). Generally, the depth of field for the image to be shot may be adjusted by adjusting the aperture or focal length of the digital camera.

In the best case, there is merely one mode in the object-distance cumulative curve. If the mode is at a left part of the object-distance cumulative curve, it indicates there are many objects at a small distance in the image 300 to be shot. Therefore, the aperture or focal length of the digital camera needs to be increased, such that the objects to be shot may have a shallow depth of field. On the contrary, if the mode is at a right part of the object-distance cumulative curve, it indicates that there are many objects at a large distance way in the image 300 to be shot. Therefore, the aperture or focal length of the digital camera needs to be decreased, so as to adjust the digital camera to have a deep depth of field.

Figure 6:
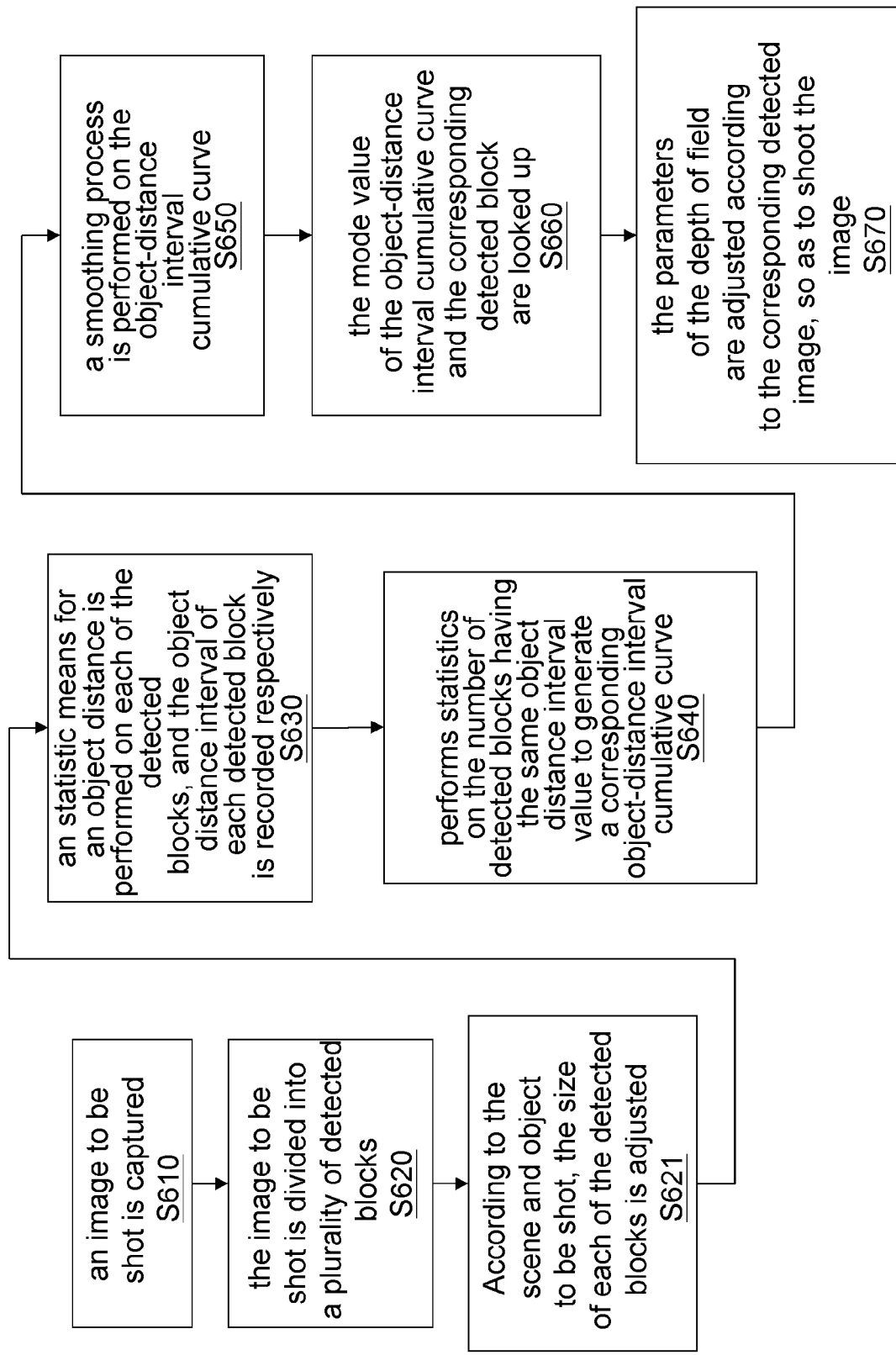
FIG. 6 is a flow chart of another embodiment of the present invention.

Besides the above process of making statistics on the detected blocks 310 having the same object distance, the present invention may also be implemented through the following manner. Referring to FIG. 6, it is a flow chart of another embodiment of the present invention. Firstly, an image to be shot is captured (Step S610). Next, the image to be shot is divided into a plurality of detected blocks (Step S620). According to the scene and object to be shot, the size of each of the detected blocks is adjusted (Step S621).

Then, an statistic means for an object distance is performed on each of the detected blocks, and the object distance interval of each of the detected blocks is recorded respectively (Step S630). Particularly, in Step S630, the object distance interval value of each of the detected blocks 310 is recorded respectively. The object distance interval value refers to considering the object distances within a fixed gap as the same object distance interval.

It is assumed that the object distance of the detected block A is detected to be 1.4 meters, and the object distance of the detected block B is 1.3 meters, and the object distance of the detected block C is 1.8 meters during the focusing process. If 1-1.5 meters is set as the same object distance interval value, the digital camera may take the detected block A and the detected block B as the same set of object distance interval values in Step S630. Through such a manner, the detected blocks having similar object distance are considered as the same set of intervals, and thus reducing the peaks.

Then, it performs statistics on the number of detected blocks having the same object distance interval value to generate a corresponding object-distance interval cumulative curve (Step S640). Referring to FIG. 7, it is a schematic view of an object-distance interval cumulative curve according to another embodiment of the present invention. Then, a smoothing process is performed on the object-distance interval cumulative curve (Step S650). Then, the mode value of the object-distance interval cumulative curve and the corresponding detected block are looked up (Step S660). Then, the parameters of the depth of field are adjusted according to the corresponding detected block 310, so as to shoot the image (Step S670).

The present invention provides a method of automatically adjusting a depth of field, which is suitable for adjusting the depth of field of the image 300 to be shot according to the object distance of each of the detected blocks in the image 300 to be shot. Before the user shoots an image, the digital camera can automatically adjust the corresponding shooting conditions of the depth of field according to the above adjusting method in the present invention.

What is claimed is:

1. A method of automatically adjusting a depth of field, suitable for adjusting parameters relevant to the depth of field when pre-shooting an image to be shot through using a digital camera, the method comprising:

dividing the image to be shot into a plurality of detected blocks;

performing a statistic means for an object distance on each of the detected blocks, and grouping the object distances into a plurality of object-distance intervals, each of which represents a range between an upper object-distance value and a lower object-distance value;

generating an object-distance interval cumulative curve according to numbers of the detected blocks having the object distance in the same object-distance interval, and looking up a mode value of the object-distance interval cumulative curve and a corresponding detected block;

performing a smoothing process on the object-distance interval cumulative curve, to eliminate a plurality of peaks in the object-distance interval cumulative curve; and adjusting the parameters of the depth of field according to the corresponding detected block, for shooting the image.

2. The method of automatically adjusting a depth of field as claimed in claim 1, wherein the step of dividing the image to be shot into detected blocks further comprises: adjusting a size of each of the detected blocks.

3. The method of automatically adjusting a depth of field as claimed in claim 2, wherein when adjusting the size of each of the detected blocks, the detected blocks are not overlapped with one another.

4. The method of automatically adjusting a depth of field as claimed in claim 1, wherein if the mode is at a left part of the object-distance interval cumulative curve, an aperture value of the digital camera is increased.

5. The method of automatically adjusting a depth of field as claimed in claim 1, wherein if the mode is at a left part of the object-distance interval cumulative curve, a focal length of the digital camera is increased.

6. The method of automatically adjusting a depth of field as claimed in claim 1, wherein if the mode is at a right part of the object-distance interval cumulative curve, an aperture value of the digital camera is decreased.

7. The method of automatically adjusting a depth of field as claimed in claim 1, wherein if the mode is at a right part of the object-distance interval cumulative curve, a focal length of the digital camera is decreased.

* * * * *